Dec. 29, 1964  S. A. WYLD  3,163,298
DETACHABLE SELF-COUNTERBALANCED TRACTOR POWERED CRANE
Filed March 5, 1963
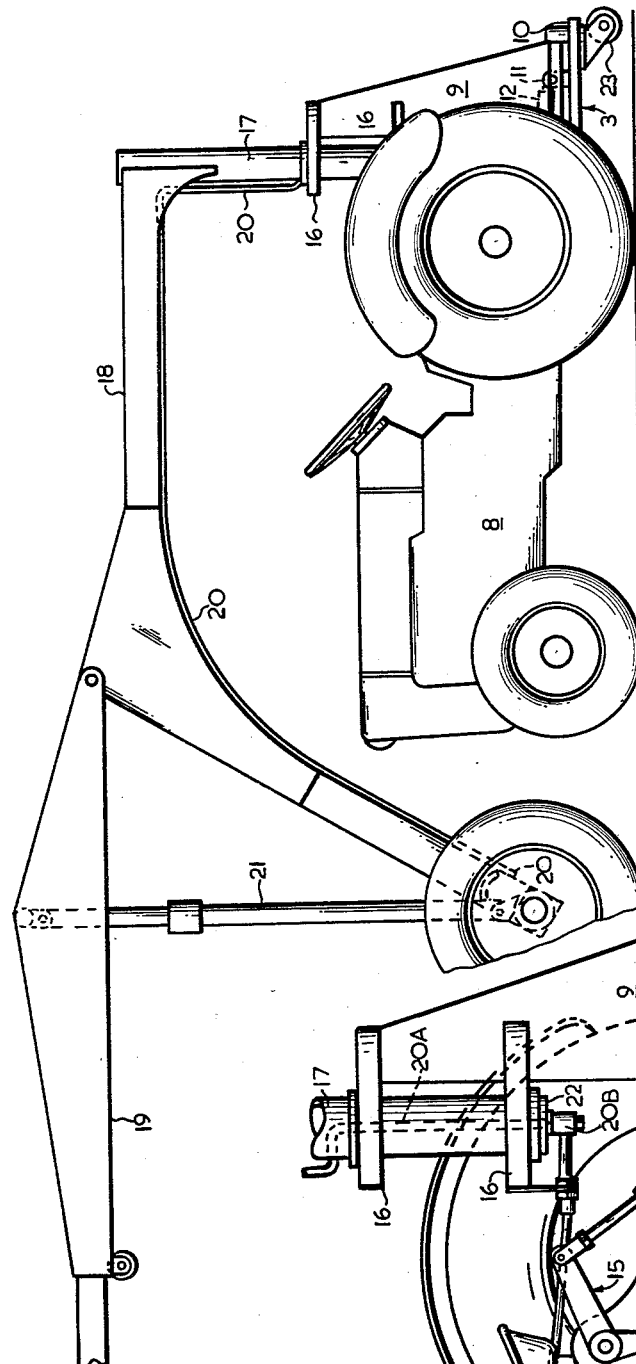
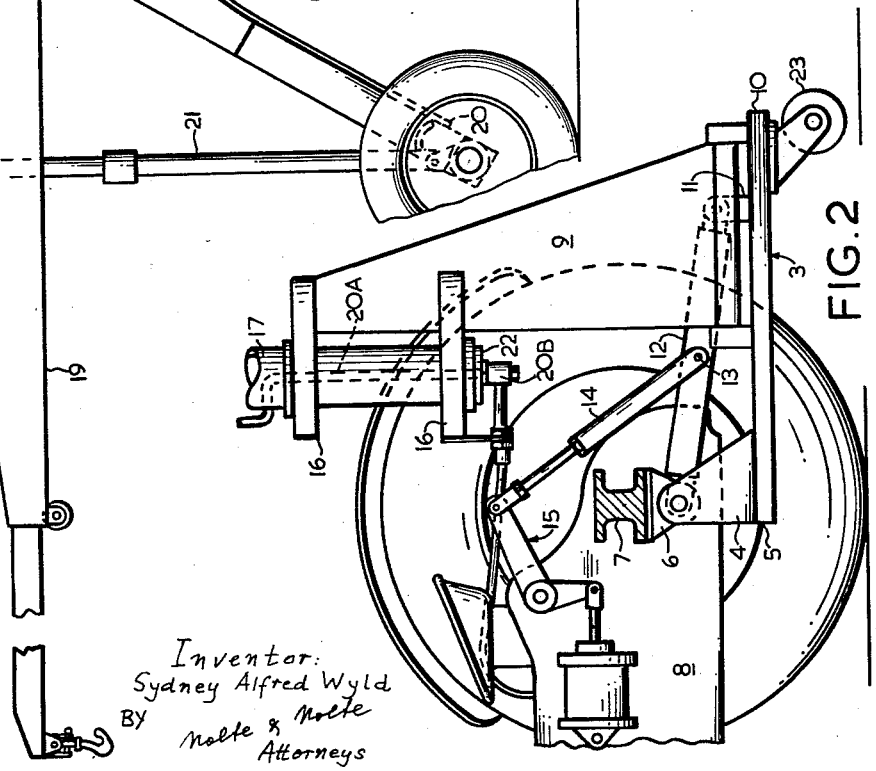
Inventor:
Sydney Alfred Wyld
BY Nolte & Nolte
Attorneys

United States Patent Office 3,163,298
Patented Dec. 29, 1964

3,163,298
DETACHABLE SELF-COUNTERBALANCED TRACTOR POWERED CRANE
Sydney Alfred Wyld, Turramurra, New South Wales, Australia, assignor to Construction Equipment Co. Pty. Limited, Auburn, New South Wales, Australia
Filed Mar. 5, 1963, Ser. No. 262,964
Claims priority, application Australia, Mar. 9, 1962, 15,210/62
5 Claims. (Cl. 212—49)

This invention relates to lifting appliances and more particularly to mobile cranes of the type having a wheel supported lifting appliance articulated to a powered transporter or tractor.

Such mobile cranes normally take the form of a powered vehicle of rugged construction equipped with driving and steering means and incorporating a lifting appliance customarily defined as a crane of the trailer type.

In general, the defined type of crane comprises a frame mounted on wheels and having on its longitudinal axis a hinged extension in one direction to provide a boom or jib raised by hydraulic power and an arm extending in the opposite direction, by which the crane structure is rotatably secured to the vehicle on a normally vertical axis for manoeuvrability.

Hitherto, the vehicle and crane elements have been combined in a substantially permanent manner and it is readily seen that such a combination is uneconomic unless continuously employed.

A primary object of the invention is to provide a tractor powered crane having a detachable linkage adapted for effectively increasing or controlling the counterbalancing forces in the crane.

It is a further object of the present invention to provide a mobile crane unit of the type defined that is quickly separable from the powered tractor, enabling the latter to be profitably employed on other classes of work.

Another object of the invention is to provide a mobile crane unit of the type defined wherein the load being lifted exerts a maximum reactive counterpoise force when the load and the tractor are aligned in the normal direction of forward travel.

Accordingly, the present invention features a mobile crane unit adapted for detachable connection to and operation with a powered tractor having a rear axle and a hydraulic pressure system including a hydraulic power take-off outlet, said crane unit comprising a platform having means for releasable attachment to the tractor, a standard erected on the platform and rotatably supporting one end of an arm which extends radially and downwardly to an axle rotatably mounting a pair of spaced road wheels, a jib pivotally attached to said arm, a hydraulic ram adapted to raise and/or lower said jib, stabilizing linkage including hydraulic means coacting with the platform and the tractor, and conduit means connecting the jib actuating ram with the tractor hydraulic system.

More particularly, it is an important feature of the present invention that the platform has normally upwardly extending spaced brackets rigidly affixed to one marginal edge, each of said brackets being pivotally connected by removable fasteners to hangers rigidly affixed to and depending from the rear axle beam or rear axle housing of a live axle of the tractor, the brackets and hangers constituting the releasable attachment means. The releasable attachment means is adapted to cooperate with the hangers, rear axle, and with the hydraulic system located forward of the rear axle, for creating the stabilizing effect in the stabilizing linkage.

The invention will now be described more specifically but it is to be understood the construction represented is exemplary only and is not to be restrictively interpreted.

A preferred embodiment of the invention is illustrated in the accompanying drawing in which:

FIGURE 1 is a side elevation of the inventive mobile crane unit, shown attached to a tractor; and FIGURE 2 is an enlarged fragmentary elevation of the rear of the tractor and the crane unit mounting platform; one wheel of the tractor has been removed to show the linkage mechanism.

In the preferred embodiment of the invention the description of which here follows use is made of a platform 3 having at least one pair of spaced, upwardly extending brackets 4 aligned on one marginal edge, hereinafter called the front edge 5 of the platform 3.

The upper ends of said brackets 4 are pivotally attached to hangers 6 affixed to the rear axle 7 of a tractor 8, the rear axle 7 being taken as an axle beam or the housing of a live axle. The platform 3 extends rearwardly of the axle 7 and has a standard 9 extending therefrom at a position towards the rear 10 of the platform 3 and having its axis intersecting the longitudinal center line of the tractor 8. Lugs 11 are affixed as by welding at a short distance from the platform rear edge 10, the lugs 11 being connected by stay members 12 to the pivots between the rear axle hangers 6 and the platform brackets 4.

At an approximate medial portion 13 the stays 12 each have a pivoted link 14 connecting them to a hydraulic lift mechanism 15 of the tractor 8, the arrangement being such that the platform 3 is suspended from the axle 7 and the said mechanism 15 in a normally horizontal manner to form a stabilizing linkage.

The upper end of the platform standard 9 is provided with spaced bearings 16 in which a normally vertical stem 17 of a crane arm 18 remote from a jib 19 is rotatably journaled.

A conduit 20 for hydraulic pressure fluid supply to a jib elevating ram 21 is conducted from the ram through the crane trailer structure and emerges axially at 20A from the lower end 22 of the said stem 17 through a rotary coupling and then continues as a flexible conduit to a coupling 20B adapted for connection to a hydraulic power take-off fitting (not shown) of the tractor.

It may now be seen that the releasable attachment of the trailer type crane to a tractor 8 by the means and in the manner above disclosed enables the tractor 8 to manoeuvre through 360 degrees relative to the crane, and the facility with which the crane element and the tractor element are separated or joined greatly extends the utility of the tractor.

When the crane and tractor are connected together and the crane has a load suspended on the jib 19, with the tractor 8 and the crane aligned on the same longitudinal center for forward travel, the load will tend to rotate the platform 3 about the tractor axle 7. This force will be transmitted through the platform stays 12 to the pivoted links 14 connecting the stays 12 to the hydraulic lift system 15 of the tractor 8. The said system 15 is normally above and spaced from the axle 7, and accordingly the force is additive to the counterweight provided by the tractor mass ahead of the tractor axle 7.

In a modified embodiment of the invention the platform 3 is provided with optional, retractable wheels 23 to aid mobility of the crane when detached from the tractor.

What I claim is:

1. A mobile crane unit adapted for detachable connection to and stabilized operation with a powered tractor, the latter having a rear axle and a hydraulic pressure system including a hydraulic power take-off outlet, comprising: a platform, a standard erected on said platform and rotatably supporting a vertical stem attached to one end of an arm which extends radially and downwardly to an axle rotatably mounting a pair of spaced road wheels, a jib pivotally attached to said arm, a hydraulic ram for selectively raising and lowering said jib, conduit means connecting said ram with said hydraulic system, hangers rigidly affixed to and depending from said rear axle, said platform having normally upwardly extending spaced brackets rigidly affixed to one marginal edge thereof, each of said brackets being pivotally removably connected to said hangers, a stabilizing linkage coacting with said platform to the rear of said axle and with said tractor forward of said axle and including hydraulic means.

2. A mobile crane unit according to claim 1, further comprising spaced stay members connecting said platform to the pivotable and removable bracket connection, a link pivotally connected at one end to each of said stay members at a medial point thereof, the other ends of said links being connected to said hydraulic means at a point forward of said axle, said stabilizing linkage being constituted by said stay members, said links and said hydraulic means.

3. A mobile crane unit according to claim 1, wherein said jib includes an arm telescopically received therein for longitudinal extension.

4. A mobile crane unit according to claim 3, further comprising wheels on said platform for facilitating movement of the crane unit when detached from said tractor.

5. A mobile crane unit according to claim 4, further comprising a universal hydraulic coupling between said hydraulic system and said ram for said selective raising and lowering of the jib, so as to allow manoeuvering of said tractor through 360 degrees relative to the crane unit when attached one to another.

References Cited by the Examiner

UNITED STATES PATENTS

| | | |
|---|---|---|
| D. 163,723 | 6/51 | Vischer. |
| 2,462,926 | 3/49 | Wilson et al. _____ 212—59 |

FOREIGN PATENTS 159,293    10/54    Australia.

SAMUEL F. COLEMAN, *Acting Primary Examiner.*
ANDRES H. NIELSEN, *Examiner.*